United States Patent [19]
Desmons

[11] Patent Number: 5,228,104
[45] Date of Patent: Jul. 13, 1993

[54] OPTICAL CONNECTION SYSTEM AND ITS USE IN THE TRANSMISSION OF VIDEO SIGNALS

[75] Inventor: Gérard Desmons, Clichy, France

[73] Assignee: Thomson Broadcast, Cergy St Christophe, France

[21] Appl. No.: 809,504

[22] PCT Filed: May 17, 1991

[86] PCT No.: PCT/FR91/00402
§ 371 Date: Jan. 16, 1992
§ 102(e) Date: Jan. 16, 1992

[87] PCT Pub. No.: WO91/18309
PCT Pub. Date: Nov. 28, 1991

[30] Foreign Application Priority Data
May 18, 1990 [FR] France .................. 90 06247

[51] Int. Cl.$^5$ .................................. G02B 6/26
[52] U.S. Cl. ........................ 385/72; 385/33; 385/74; 385/78; 385/84
[58] Field of Search .......... 385/33, 52, 66, 72, 385/74, 78, 84, 76, 101

[56] References Cited

U.S. PATENT DOCUMENTS

| | | |
|---|---|---|
| 4,573,760 | 3/1986 | Fan et al. ................ 385/33 |
| 4,738,507 | 4/1988 | Palmquist ............... 385/78 |
| 4,762,389 | 8/1988 | Kaihara .................. 385/72 |
| 4,793,683 | 12/1988 | Cannon, Jr. et al. ...... 385/72 |
| 5,129,023 | 7/1992 | Anderson et al. ....... 385/72 |
| 5,146,525 | 9/1992 | Tabone .................. 385/78 |
| 5,170,452 | 12/1992 | Ott ....................... 385/60 |

FOREIGN PATENT DOCUMENTS

| | | | |
|---|---|---|---|
| 0366346 | 5/1990 | European Pat. Off. ......... 385/66 X |
| 3721060 | 1/1989 | Fed. Rep. of Germany ... 385/84 X |
| 2629220 | 9/1989 | France ..................... 385/84 X |
| 8906057 | 6/1989 | World Int. Prop. O. ........ 385/66 X |

OTHER PUBLICATIONS

Patent Abstracts of Japan, vol. 13, No. 82 (P-833) [3430], Feb. 23, 1989, & JP, A, 63265207 (Fujikura) Nov. 1, 1988.

Primary Examiner—Brian Healy
Attorney, Agent, or Firm—Oblon, Spivak, McClelland, Maier & Neustadt

[57] ABSTRACT

The optical connection system comprises at least one optical connection element composed of three separate portions A, B, C; the portion A comprises an optical contact of the pump-action optical contact type whose calibrated end-piece is intended for the cabling of an optical fibre, the portion B comprises at one end a calibrated end-piece identical to the end-piece of the portion A and comprises at the other end an optical contact, of the lensed optical contact type, which contact is intended for the optical connection with a complementary optical connection element, the portion C comprises a calibrated guiding system in order to receive the calibrated end-pieces of the portions A and B, to place their respective ends in contact and to ensure a very accurate coaxial alignment of the two end-pieces.

6 Claims, 5 Drawing Sheets

OPTICAL CONNECTION SYSTEM AND ITS USE IN THE TRANSMISSION OF VIDEO SIGNALS

BACKGROUND OF THE INVENTION

1. Field of the Invention

The present invention relates to an optical connection system and to its application to the transmission of video signals.

2. Discussion of Background

Currently, various optical connector technologies are used.

The attached FIG. 1 shows a sectional view along a longitudinal axis OX of a known optical connection system comprising a pump-action optical contact. This technology is especially used for the fibre optic cabling of towns. The connection system comprises two complementary connection elements: a male element, 10, and a female element, 20 complementary to the male element. The male element, 10, comprises, along a longitudinal axis OX, an end-piece 11 having a spring 12. An optical fibre 13 of the same axis is sealed in the centre of the end-piece 11. A metallic part, 14, mechanically retains the assembly. The female element, 20, comprises along a longitudinal axis OX, a central optical fibre, 21, sealed in an end-piece of the same gage as the end-piece of the male element, this end-piece being provided with a part 22, forming a guide, intended for the centreing of the male element when the connection is carried out.

This technology is well mastered and the mounting of the optical contacts requires few tools and remains within the scope of a trained technical person. However, with an optical fibre having a small diameter, the axial and longitudinal alignment of the two fibres, 13, 21, has to be perfect to within a few fractions of micrometers. Likewise, because of the small diameter of the light flux, this type of connector has cleanliness problems as it does not tolerate the least dust particle in the optical path.

The attached FIG. 2 shows a sectional view, along a longitudinal axis OX, of another known optical connection system, comprising a lensed optical contact. This type of connection is especially used for military applications. It is composed of a male element, 30, and of a female element, 40, of which each comprises a central optical fibre, 31, 41, of the same axis. At the end of each optical fibre, 31, 41, and in its continuation, a divergent optical lens 32, 42 is fixed. Each lens 32, 42, causes the light beam arising from the optical fibre to diverge, which enables the problems of optical alignment and of dust in the optical path to be reduced. This technology is less critical for the positioning of the optical fibre and for the cleanliness of the optical contact in relation to the technology of the pump-action contact of FIG. 1; but the positioning of the optical fibre in relation to the optical lens has to be perfect. Therefore, the cabling of the optical fibre can only be performed by the supplier of the optical connection element. On the other hand, the polishing and the bonding of the fibre onto the optical lens requires very special and very expensive tools which only the supplier possesses.

Finally, the attached FIG. 3 shows a sectional view of a third known optical connection system comprising a lensed optical contact with a port. Although this technology is similar to that of FIG. 2, each of the male and female connectors furthermore comprises, placed in front of each of the optical lenses, 31, 32, an outer glass port, 33, 34 which protects it. The optical contact is thus impervious and the cleaning easy. However, the positioning of the optical fibre in relation to the optical lens is as tricky as for the optical connection system of FIG. 2.

An optical link not generally being produced in a permanent manner, the optical connection elements are frequently handled, which deteriorates the optical contact intended for the optical link with a complementary optical connection element. Under these conditions, it is necessary to replace the optical connection elements and for this, in the various known optical connector technologies, it is necessary to cut the fibre optic cable. The cabling of the optical fibre on the end-piece of the replacement connector then requires special tools and a skilled work force.

SUMMARY OF THE INVENTION

The object of the invention is to solve this problem without special tools and without the intervention of a specialist and to produce an optical connection system enabling easy mounting and solving the problems of positioning of the optical fibre and of the cleanliness of the optical contact. For this, the invention relates to an optical connection system in which an optical connection element has a modular and demountable structure which makes it possible to dissociate, within the same connection element, the connecting of a cable comprising at least one optical fibre and the transmission of the light beam at the level of the optical connection with a complementary connection element.

For this purpose, a connection element comprises two separate portions positioned in a third portion, thanks to a guiding system forming a sleeve, in such a way as to obtain two separate optical contacts.

The two portions are respectively intended for the cabling of the optical fibre of one cable and to the optical connection with a complementary connection element.

The portion intended for the optical connection with a complementary connection element is then an interchangeable portion which may be replaced in the event of deterioration of the optical contact intended for the optical link without having to handle the optical fibre at the level of the cable.

According to the invention, the optical connection system comprises at least one optical connection element constituted by three separate portions A, B, C, the portion A being intended for the connecting of a cable comprising at least one optical fibre and comprising an optical contact (AO) mounted on a calibrated end-piece intended for the cabling of the optical fibre of the cable; the portion B being an interchangeable portion intended for the transmission of a light beam and comprising an optical fibre, one end (BO) of which is fixed in a calibrated end-piece identical to the end-piece of the portion A and intended to be placed in the continuation of the end-piece of the portion A and a second end of which comprises an optical contact intended for the optical connection with a complementary connection element; the portion C comprising a calibrated guiding system in order to receive the calibrated end-pieces of the portions A and B, to place their respective ends in contact and to ensure a very accurate coaxial alignment, to within a few fractions of a micrometer, of the two end-pieces each corresponding to the portions A and B.

BRIEF DESCRIPTION OF THE DRAWINGS

Other features and advantages of the invention will appear clearly in the following description given by way of non-limiting example and made with reference to the attached figures which represent:

the abovementioned FIG. 1, a sectional view of an optical connection system comprising a pump-action optical contact according to the prior art;

Figure 1:
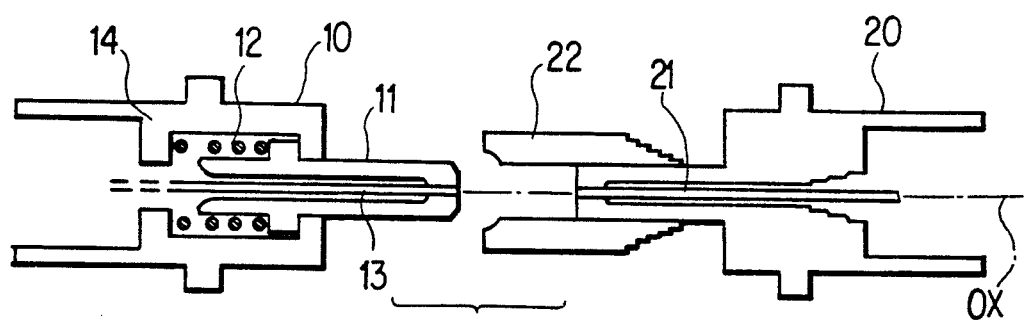
Figure 2:
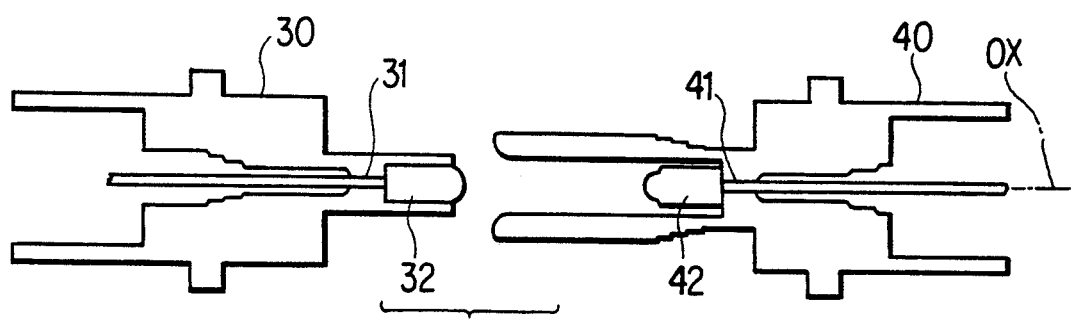
Figure 3:
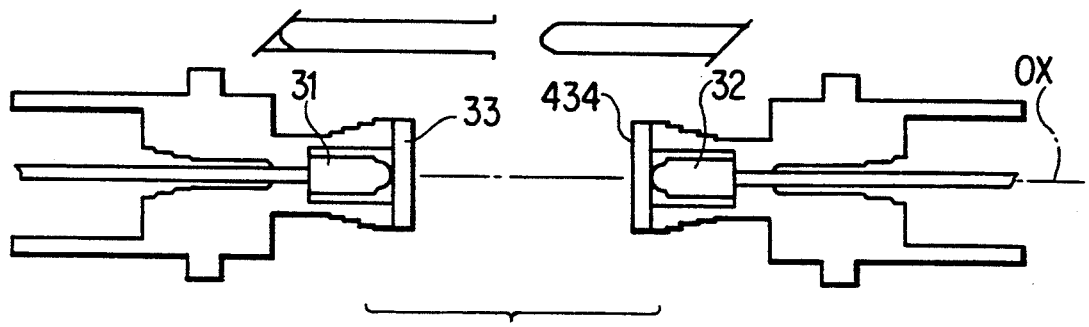
Figure 4:
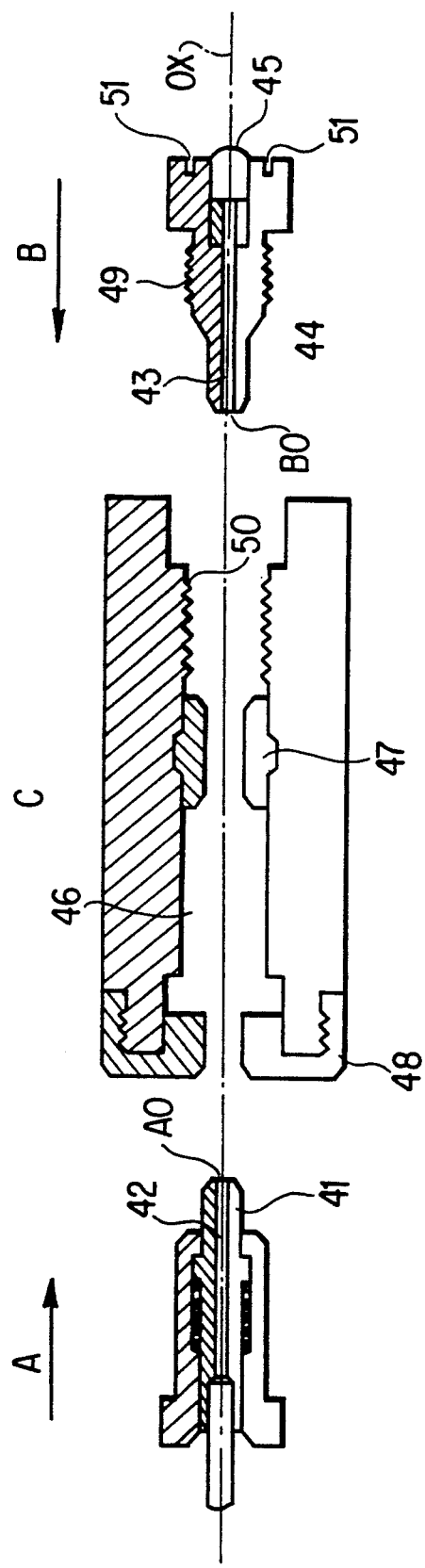
Figure 5:
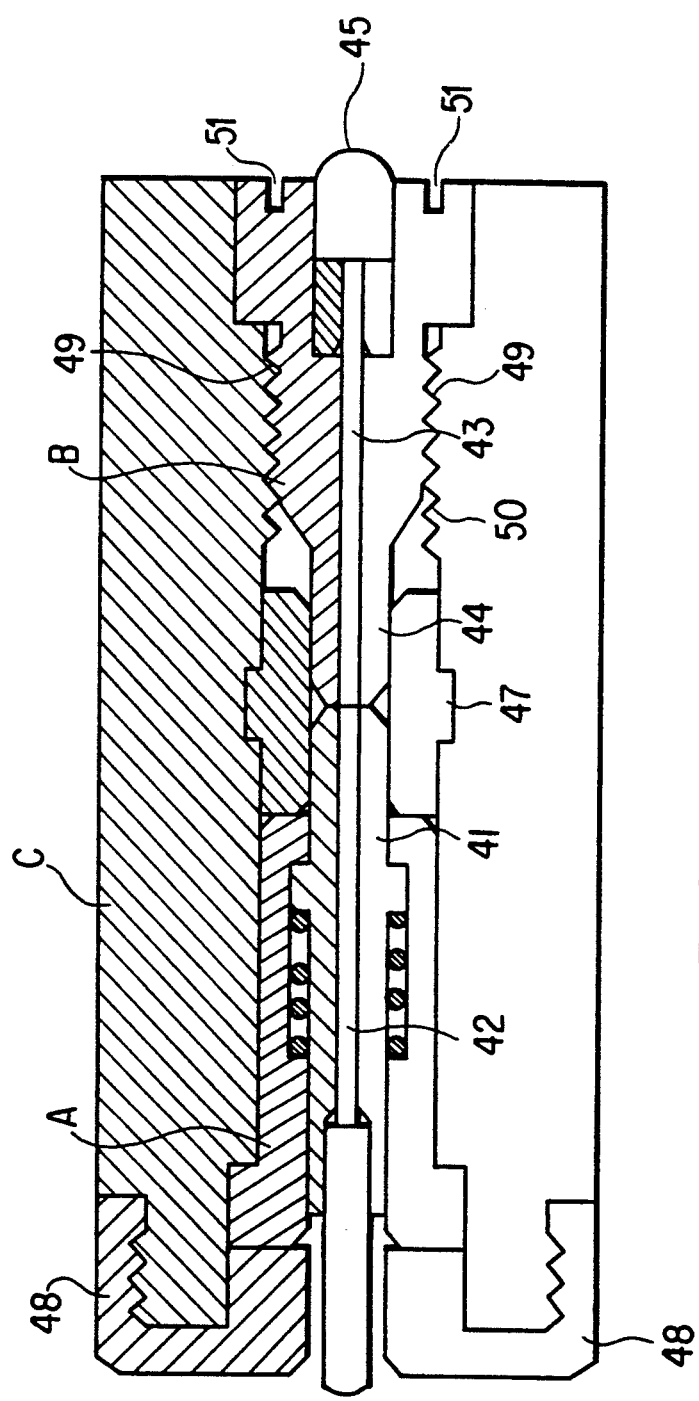
Figure 6:
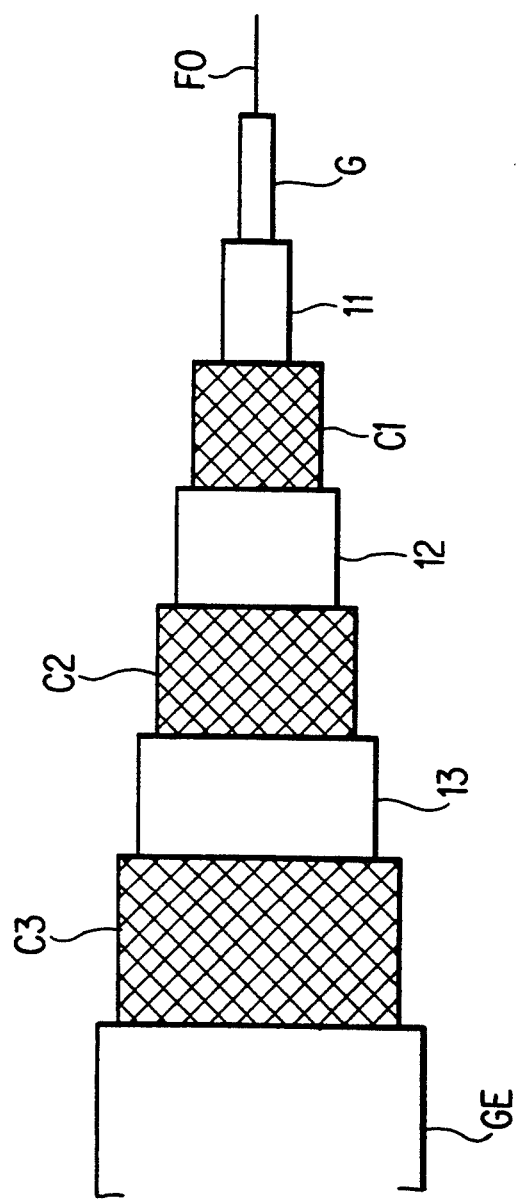
Figure 7:
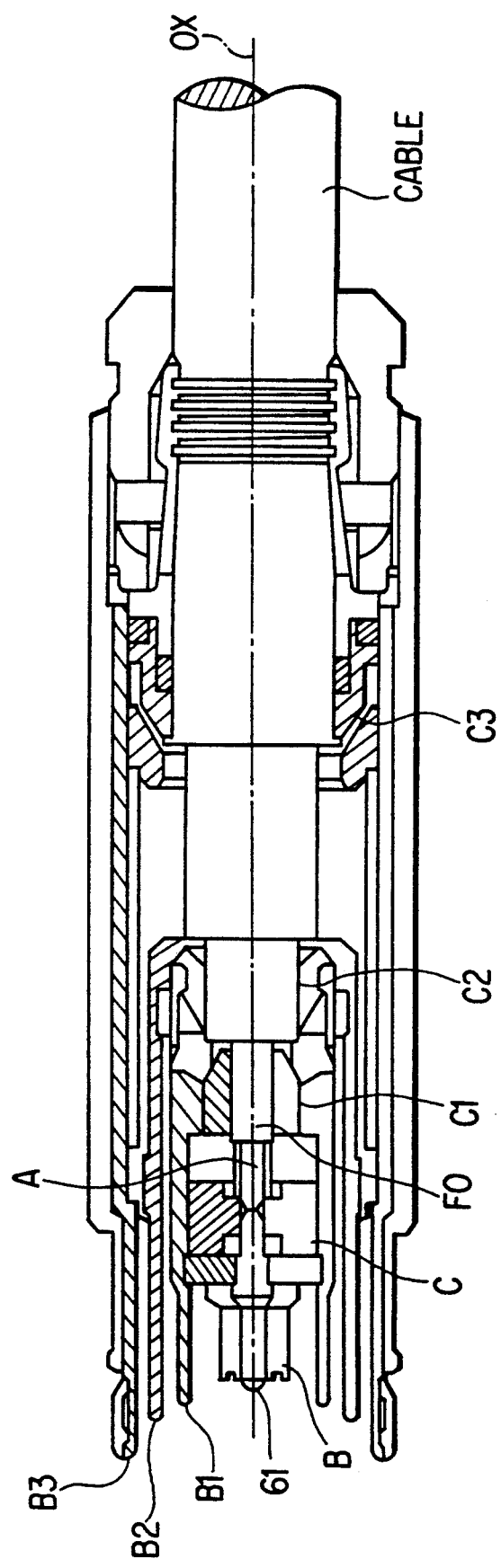

the abovementioned FIG. 2, a sectional view of an optical connection system comprising a lensed optical contact according to the prior art;

the abovementioned FIG. 3, a sectional view of an optical connection system comprising a lensed optical contact with a port according to the prior art;

FIG. 4, a sectional view, along a longitudinal axis OX, of an optical connection element according to the invention;

FIG. 5, an example of a connection diagram of a connection according to the invention;

FIG. 6, an optical triaxial hybrid cable;

FIG. 7, a partial sectional view along a longitudinal axis OX, of an example of the use of the connection system, according to the invention, for the transmission of video signals.

DETAILED DESCRIPTION OF THE PREFERRED EMBODIMENT

The remainder of the description relates to an element of the connection system. It is well understood that, in order to establish an optical link, it is necessary to use a second connection element complementary to the first element which may have a similar structure composed of three separate portions.

FIG. 4 represents a sectional view along a longitudinal axis OX of an optical connection element according to the invention. This element comprises three separate portions, A, B, C, as FIG. 4 shows. The portion A is intended for the cabling of the optical fibre of an optical cable onto an end-piece. It comprises a pump-action optical contact AO mounted on an end-piece, 41, of longitudinal axis OX and accurately calibrated so as to enable the optical fibre 42 to be axially positioned to within a few fractions of a micrometer. The optical fibre 42 is positioned and sealed in the end-piece, 41, according to a method of known principle.

The portion B is an interchangeable portion intended for the optical connection of the element with a complementary connection element. This portion B comprises at its centre, along a longitudinal axis OX, a central optical fibre, 43, of the same axis OX, having an end BO sealed in a calibrated end-piece, 44, identical to the end-piece, 41, of the portion A, the other end being fixed to a lens device 45 which ensures the divergence of the light beam upon optical connection. The method for mounting and sealing the optical fibre and positioning it in relation to the lens is of known principle.

The portion C is the body of the connector and has a symmetry of revolution about a longitudinal axis OX. This portion C forms an open axial cavity, 46, intended for receiving the portions A and B in such a way that their respective end-pieces 41 and 44 are in contact. The inside of the cavity comprises a calibrated guide, 47, enabling the end-pieces 41 and 44 of each of the portions A and B to be coaxially aligned with great accuracy to within a few fractions of a micrometer.

FIG. 5 represents an example of a connection diagram of a connection element according to the invention. The portions A and B are positioned in the body of the connector C and held in position by fixing means. In FIG. 5, the portion A is locked in position by a screw device, 48, and the portion B comprises a thread, 49, enabling it to be screwed into the body of the connector C which comprises a corresponding thread, 50. Two notches, 51, are provided for the clamping tools.

The optical connection system of the invention may be used alone or in combination with one or more electrical connection systems. This case occurs especially for the connecting of an electrical and optical hybrid cable which may for example have a triaxial structure and comprise a central optical fibre.

The optical connection system according to the invention may be specially used when signals, on an optical fibre, are transmitted between a camera head and its control unit, in particular for future high definition television (HDTV).

For this purpose, the transmission of the television signals is generally carried out by the agency of electrical triaxial cables. But for high definition television, this type of cable has significant high-frequency attenuation and it is preferable to use an optical fibre for transmitting the wide-band video signals. However, electrical links are also required for transmitting the power supply of the camera and emergency service signals as well as for the earthing of the cable.

A structure particularly adapted for this application is represented in FIG. 6. It consists in using a triaxial and optical hybrid cable, that is to say having a triaxial structure constituted along the same central axis by at least three electrical conductors C1, C2, C3 which are tubular, concentric, intermeshed, separated by insulating tubes, I1, I2, I3, this triaxial structure comprising a central optical fibre, FO, of the same axis, this optical fibre being covered with a jacket, G. An outer jacket, GE, protects the overall structure of the cable.

In order to carry out the connecting between the camera head and its control unit, the connecting of the optical fibre at the level of the connectors (plug on the cable, or socket on the camera) is very tricky. By using an electrical and optical hybrid connection system in which the optical connection portion is produced according to the invention, the connecting may be carried out, without taking special precautions, that is to say that it requires no complex tools and no necessity for returning to the manufacturer in the event of after-sale service.

In FIG. 7 is represented a partial sectional view along a longitudinal axis OX of an example of use of the connection system for the connection of a triaxial and optical hybrid cable in which the optical connection portion is produced according to the invention.

In order to interconnect the optical and electrical signals flowing in a triaxial and optical hybrid cable, the electrical and optical hybrid connection element presented in FIG. 7 comprises:

an optical connection element, 61, produced in three separate portions, A, B, C such that the portion A comprises a pump-action optical contact in the end-piece of which a central optical fibre FO covered by a jacket is sealed, the portion B comprises a lensed optical contact intended for producing the connection with a complementary optical connection element, the portions A and B being positioned in the body of a connector C where they are held in position by fixing means.

an electrical connection element of known principle comprising three metallic pins B1, B2, B3 to which three conductors C1, C2, C3 are connected, these three conductors forming a triaxial structure. This electrical connection element therefore has a triaxial connector structure.

The optical fibre being disposed in the centre of the triaxial structure of the hybrid cable, the optical connection element, 61, is disposed in the centre of the hybrid connection element structure, the assembly of the two connection elements thus forming an optical triaxial hybrid connection structure.

The invention is not limited to the embodiments precisely described and, especially, the optical connection system may be used alone, in combination with one or more optical connectors, in combination with one or more electrical connectors. The optical contacts of the portions A and B are not necessarily pump-action and lensed optical contacts and any other type of optical contact may be used without departing from the scope of the invention, the essential characteristic of the invention being the use of two separate portions positioned in the body of a connector in such a way as to obtain two separate optical contacts, which makes it possible to be able to dissociate the cabling of the optical fibre and the optical connection with a complementary connection element Likewise, the means for fixing the optical contacts are not necessarily screw devices and any other fixing means, such as for example locking by a clip, pushing a ball in, a quarter-turn, etc . . . may be used without departing from the scope of the invention. The mounting of the two portions A and B in the body of the connector may be carried out from the front or from the rear without departing from the scope of the invention.

I claim:

1. Optical connection system, characterised in that it comprises at least one optical connection element constituted by three separate portions A, B, C, the portion A being intended for the connecting of a cable comprising at least one optical fibre and comprising an optical contact (AO) mounted on a calibrated end-piece intended for the cabling of the optical fibre of the cable; the portion B being an interchangeable portion intended for the transmission of a light beam and comprising an optical fibre, one end (BO) of which is fixed in a calibrated end-piece identical to the end-piece of the portion A and intended to be placed in the continuation of the end-piece of the portion A and a second end of which comprises an optical contact intended for the optical connection with a complementary connection element; the portion C comprising a calibrated guiding system in order to receive the calibrated end-pieces of the portions A and B, to place their respective ends in contact and to ensure a very accurate coaxial alignment, to within a few fractions of a micrometer, of the two end-pieces each corresponding to the portions A and B.

2. Optical connection system according to claim 1, characterised in that the optical contact of the portion A is a pump-action optical contact and the optical contact of the portion B is a lensed optical contact.

3. Optical connection system according to any one of claims 1 or 2, characterised in that it comprises fixing means enabling the portions A and B to be locked in position in the portion C.

4. An optical connection system according to any one of claims 1 or 2 wherein, for the transmission of video signals, said system further comprises at least one electrical connection element used in conjunction with said optical connection element.

5. The connection system according to claim 4, characterised in that the video signals are transmitted on an electrical and optical hybrid cable.

6. The connection system according to claim 5, characterised in that the electrical and optical hybrid cable has a triaxial structure comprising a central optical fibre.

* * * * *